(12) United States Patent
Besmer et al.

(10) Patent No.: US 8,843,666 B2
(45) Date of Patent: Sep. 23, 2014

(54) METHOD FOR OPTIMIZING WIDE PORT POWER MANAGEMENT IN A SAS TOPOLOGY

(75) Inventors: Brad Besmer, Colorado Springs, CO (US); Brian A. Day, Colorado Springs, CO (US); Scott Dominguez, Colorado Springs, CO (US); Kevin A. Mocklin, Mansfield, MA (US); David J. Golden, Millville, MA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/410,374

(22) Filed: Mar. 2, 2012

(65) Prior Publication Data

US 2013/0232281 A1 Sep. 5, 2013

(51) Int. Cl.
*G06F 3/00* (2006.01)

(52) U.S. Cl.
USPC ............................................. 710/15; 710/36

(58) Field of Classification Search
USPC ........................................................ 710/15
See application file for complete search history.

(56) References Cited

U.S. PATENT DOCUMENTS

| 2007/0093124 | A1 | 4/2007 | Varney et al. | |
|---|---|---|---|---|
| 2008/0209246 | A1* | 8/2008 | Marks et al. | 713/323 |
| 2009/0007155 | A1* | 1/2009 | Jones et al. | 719/327 |
| 2009/0132838 | A1* | 5/2009 | Cherian et al. | 713/320 |
| 2010/0064086 | A1* | 3/2010 | McCarty et al. | 710/300 |

* cited by examiner

*Primary Examiner* — Henry Tsai
*Assistant Examiner* — John Roche
(74) *Attorney, Agent, or Firm* — Suiter Swantz pc llo

(57) ABSTRACT

A SAS expander or initiator places PHYs in a wide port into a persistent reduced power state by signaling to the connected SAS device that the SAS expander or initiator intends to route data traffic through other PHYs in the wide port. The SAS expander or initiator and connected SAS device agree to disuse certain PHYs so that the PHYs enter a reduced power state according to SAS standards.

15 Claims, 6 Drawing Sheets

US 8,843,666 B2

METHOD FOR OPTIMIZING WIDE PORT POWER MANAGEMENT IN A SAS TOPOLOGY

BACKGROUND OF THE INVENTION

Reducing the power usage of computers and various computer components has become a high priority in most system designs (minimizing the total cost of ownership). From a controller/expander perspective, much of the focus has been on adding features to the SAS/SATA specifications that allows the host controller, expander or data storage device to initiate a transition to either a Partial or Slumber power mode. Each power mode allows a different level of power savings to be achieved. This works well when the connected device only uses a single link since the link power mode will only change when a particular setting allows. When the topology includes a wide port (a wide port is typically made up of links grouped in multiples of 4) the power management gets more complicated. A wide port increases the bandwidth by sending and receiving I/Os on any of the available links, thereby limiting I/O delays. This flexibility can increase power savings in situations where the consumed bandwidth doesn't require all of the available links so one or more links may enter a reduced power state.

When an I/O is sent from a controller to an expander on one Link but the response is received on a different Link, the second Link may be brought out of a reduced power mode (example: an expander may use a round robin algorithm when determining which link of a wide port to send I/O responses).

Consequently, it would be advantageous if an apparatus existed that is suitable for negotiating between devices to allow specific Links to enter a persistent reduced power state.

SUMMARY OF THE INVENTION

Accordingly, the present invention is directed to a novel method and apparatus for negotiating between devices to allow specific Links to enter a persistent reduced power state.

One embodiment of the present invention is an expander with a plurality of PHYs configured into a wide port. The expander sends a signal indicating an intention to not use one or more PHYs comprising the wide port so that those PHYs may enter a reduced power state. Those PHYs may then remain in a reduced power state until the expander sends another signal indicating an intention to use those PHYs.

Another embodiment of the present invention is a method for keeping PHYs in a reduced power state by negotiating between two devices connected by a wide port to route all data traffic away from one or more PHYs in the wide port. The one or more PHYs will then remain in a reduced power state until the devices negotiate to start using the one or more PHYs.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
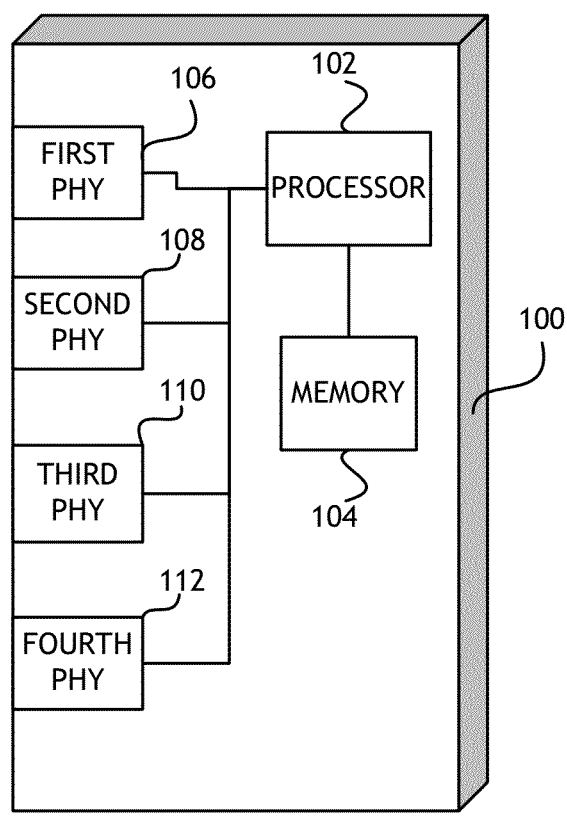
FIG. 1 shows a block diagram of an SAS device suitable for implementing the present invention.

Referring to FIG. 1, a block diagram of a first Serial Attached SCSI (SAS) device 100 is shown. The first SAS device 100 may have a processor 102 connected to a memory 104, and a plurality of PHYs 106, 108, 110, 112, also connected to the processor 102. PHYs 106, 108, 110, 112 are the physical hardware connection points in an SAS device 100. One skilled in the art may appreciate that the first SAS device 100 may be an expander, initiator, controller or any other device conforming to the parameters set forth herein. The first SAS device 100 may conform to SAS standards set forth in T10 specifications.

Figure 2:
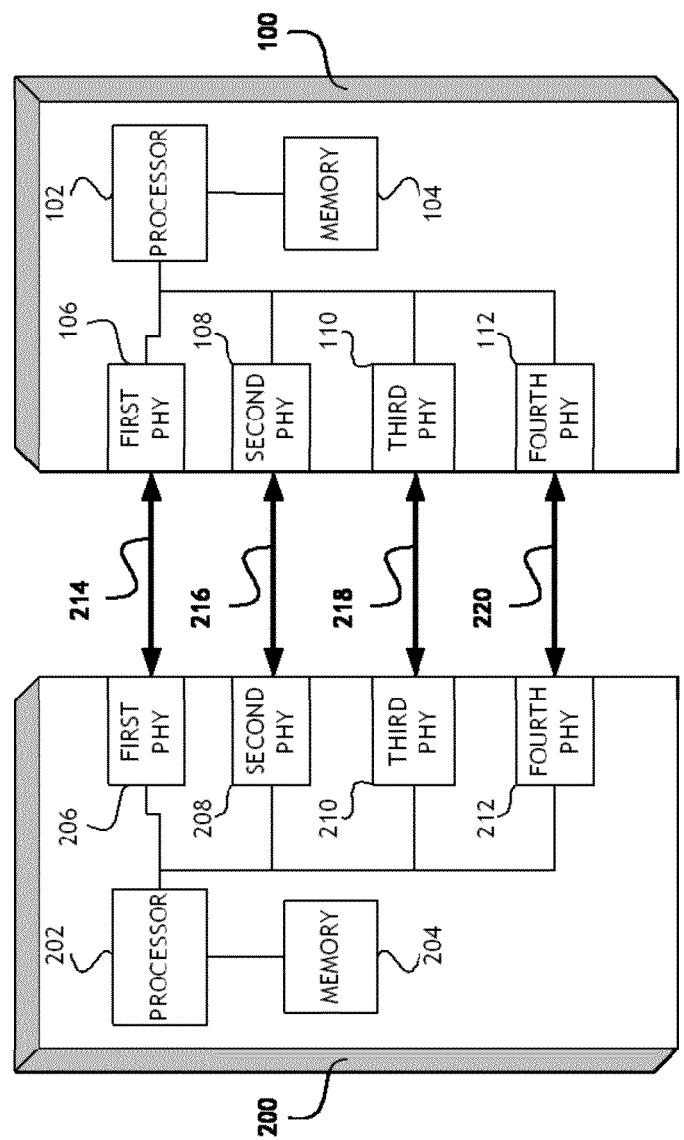
FIG. 2 shows a block diagram of two SAS devices connected across four PHYs to form a wide port.

Referring to FIG. 2, two SAS devices 100, 200 are shown. The second SAS device 200 may have a processor 202 connected to a memory 204, and a plurality of PHYs 206, 208, 210, 212, also connected to the processor 202. One skilled in the art may appreciate that the second SAS device 200 may be an expander, initiator, controller, end device such as a data storage device or any other device conforming to the parameters set forth herein. The second SAS device 200 may conform to SAS standards set forth in T10 specifications.

The first SAS device 100 and the second SAS device 200 may be connected by a plurality of links 214, 216, 218, 220 through each of their respective plurality of PHYs 106, 108, 110, 112, 206, 208, 210, 212. The first PHY 106 of the first SAS device 100 may be connected to the first PHY 206 of the second SAS device 200; the second PHY 108 of the first SAS device 100 may be connected to the second PHY 208 of the second SAS device 200; the third PHY 110 of the first SAS device 100 may be connected to the third PHY 210 of the second SAS device 200; and the fourth PHY 112 of the first SAS device 100 may be connected to the fourth PHY 212 of the second SAS device 200. Two or more of the links 214, 216, 218, 220 between any set of PHYs 106,206, 108,208, 110,210, 112,212 of the first SAS device 100 and the second SAS device 200 may be designated a "wide port." A wide port is a logical construct whereby a single logical connection utilizes two or more physical connections between devices. For example; in a configuration such as the one shown in FIG. 2, the four links 214, 216, 218, 220 may be designated a wide port. Any application or operation attempting to communicate from the first SAS device 100 to the second SAS device 200 may access a single port to send a communication; the communication may be sent through a link 214 connecting the first PHY 106 on the first SAS device 100 to the first PHY 206 on the second SAS device 200. A response to that communication may subsequently be sent through a link 218 connecting the third PHY 110 on the first SAS device 100 to the third PHY 210 on the second SAS device 200. The application or operation receiving the response from the second SAS device 200 would receive the response through the same port it sent the original communication. In a wide port, the physical path used for each portion of a communication is transparent and not necessarily predictable.

Figure 3:
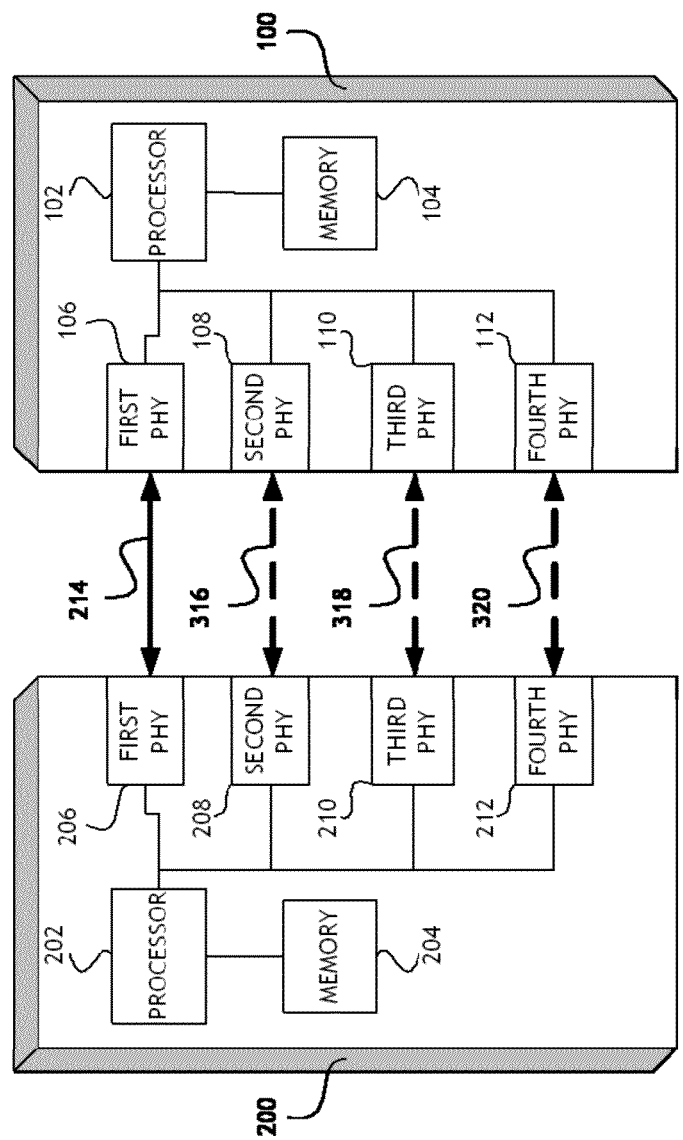
FIG. 3 shows a block diagram of the two SAS devices in FIG. 2 wherein three of the PHYs have entered a reduced power state.

Referring to FIG. 3, the two SAS devices 100, 200 as in FIG. 2 are shown. When links 214, 316, 318, 320 between PHYs 106, 108, 110, 112, 206, 208, 210, 212 in a wide port are not utilized for a period of time, the SAS devices 100, 200 may put those PHYs 106, 108, 110, 112, 206, 208, 210, 212 in a reduced power state as defined by SAS standards. Links 214, 316, 318, 320 in a wide port may not be utilized for a period of time when data traffic between two SAS devices 100, 200 connected by a wide port does not use all of the bandwidth provided by the wide port. SAS standards define two reduced power states: "partial" and "slumber;" slumber is the more conservative of the two reduced power states and therefore requires more time to recover.

SAS devices 100, 200 have the capability to disable, or power off one or more links 214, 316, 318, 320, but where an SAS device 100, 200 is configured as an expander or data storage device, the SAS device 100, 200 cannot know in advance which links 214, 316, 318, 320 the connected SAS device 100, 200 may attempt to use. Therefore, expanders and data storage devices cannot disable PHYs 106, 108, 110, 112, 206, 208, 210, 212.

Where two SAS devices 100, 200 according to the present invention are connected by a wide port such as in FIG. 3, and where data traffic is not utilizing all of the bandwidth provided by the wide port, the first SAS device 100 may identify one or more underutilized links 316, 318, 320. The underutilized links 316, 318, 320 may be in a reduced power state as defined by SAS standards, or they may be utilized sporadically such that they do not enter a reduced power state, but would if data traffic were consolidated to less than all of the links 214, 316, 318, 320 comprising a wide port. Alternatively, data traffic may sporadically utilize all of the bandwidth in a wide port such that some links 316, 318, 320 routinely enter a reduced power state, but are re-activated, or brought out of the reduced power state, every time data traffic increases. In such a situation, links 316, 318, 320 may enter a partial power state, but never enter the more power conserving slumber state.

When the first SAS device 100 has identified one or more underutilized links 316, 318, 320, the first SAS device 100 may send a signal to the second SAS device 200 indicating the intention of the first SAS device 100 to route all data traffic away from one or more of the underutilized links 316, 318, 320. The signal may take the form of a Serial Management Protocol (SMP) request. One skilled in the art may appreciate that the signal may utilize any in-band or out-of-band signaling mechanisms, and that the specification of SMP in this embodiment is purely exemplary. The signal may be sent through any link 214, 316, 318, 320 connecting the first SAS device 100 to the second SAS device 200.

The second SAS device 200, upon receiving the signal indicating the intention of the first SAS device 100 to route all data traffic away from one or more of the underutilized links 316, 318, 320, may send a response to the first SAS device 100 acknowledging such intention. The second SAS device 200 may then designate the PHYs 208, 210, 212 associated with the indicated, underutilized links 316, 318, 320 as unused. The designated PHYs 208, 210, 212 may then enter a reduced power state according to SAS standards. PHYs 208, 210, 212 may be designated as unused by a processor 202 by entering such PHYs 208, 210, 212 in a table or other data structure recording such unused PHYs 208, 210, 212, the table or other data structure being stored in memory 204

The first SAS device 100, upon receiving the response acknowledging the first SAS device's 100 intention to route all data traffic away from one or more of the underutilized links 316, 318, 320, may designate the PHYs 108, 110, 112 associated with the indicated, underutilized links 316, 318, 320 as unused. The designated PHYs 108, 110, 112 may then enter a reduced power state according to SAS standards. PHYs 108, 110, 112 may be designated as unused by a processor 102 by entering such PHYs 108, 110, 112 in a table or other data structure recording such unused PHYs 108, 110, 112, the table or other data structure being stored in memory 104

The SAS device 100, 200 that sends the initial signal indicating the intention of the SAS device 100, 200 to route all data traffic away from one or more of the underutilized links 316, 318, 320 may be considered the "master" device; in the present example the first SAS device 100 is the master device. The SAS device 100, 200 that receives the initial signal may be considered the "slave" device; in the present example the second SAS device 200 is the slave device. Master devices may be expanders or controllers. Slave devices may be expanders or data storage devices. The master/slave relationship between SAS devices 100, 200 prevents conflicting actions whereby both sides of a wide port connection attempt to designate different underutilized links 316, 318, 320 as unused. Where one SAS device is an end device and the other SAS device is an expander, the expander may be the master device. Where both SAS devices are end devices but only one is Serial SCSI Protocol (SSP) initiator-capable, the SSP initiator-capable device may be the master. Where both SAS devices are end devices and both are SSP initiator-capable, the SAS device with the highest SAS address may be the master.

Figure 4:
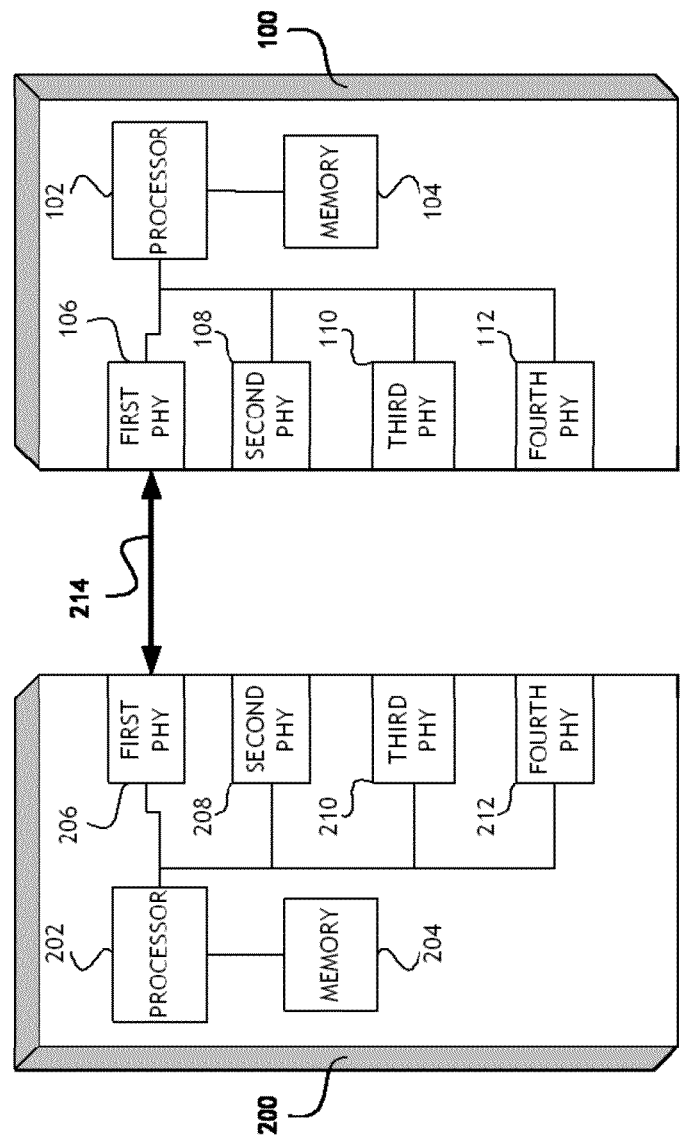
FIG. 4 shows a block diagram of the two SAS devices in FIG. 2 wherein three of the PHYs are designated to remain in a reduced power state.

Referring to FIG. 4, the two SAS devices 100, 200 as in FIG. 3 are shown where only one link 214 in a wide port remains active. The PHYs 108, 110, 112, 208, 210, 212 associate with three underutilized links have been designated as unused. One link 214 must remain active between the first SAS device 100 and the second SAS device 200. The one active link 214 may enter a reduced power state according to SAS standards but the associated PHYs 106, 206 may not be designated as unused because at least one link 214 must exist to reactive the designated unused PHYs 108, 110, 112, 208, 210,212.

Where certain PHYs 108, 110, 112, 208, 210, 212 have been designated unused and allowed to enter a reduced power state, data traffic may increase such that the data traffic would consistently occupy more bandwidth in the wide port than is available through the active (not designated unused) PHYs 106, 206. In that case, the master device, in this case the first SAS device 100, may send a signal through the active link 214 indicating an intention to re-active one or more designated unused PHYs 108, 110, 112. The slave device, in this case the second SAS device 200, upon receiving the signal indicating the intention of the master device to re-active one or more designated unused PHYs 108, 110, 112, may send a response to the master device acknowledging such intention. The slave device may then designate one or more of the unused PHYs 208, 210, 212, specified by the signal indicating the intention of the master device, as active. The processor 202 may designate PHYs 208, 210, 212 as active by removing such PHYs 208, 210, 212 from the table or other data structure recording unused PHYs 208, 210, 212. Metadata, stored in memory and associated with each PHY 206, 208, 210, 212 may also be modified as appropriate to indicate the status of each PHY 206, 208, 210, 212.

The master device, upon receiving the response acknowledging the master device's intention to re-active one or more designated unused PHYs 108, 110, 112, may designate one or more of the unused PHYs 108, 110, 112 as active. The processor 102 may designate PHYs 108, 110, 112 as active by removing such PHYs 108, 110, 112 from the table or other data structure recording unused PHYs 108, 110, 112. Metadata, stored in memory and associated with each PHY 106, 108, 110, 112 may also be modified as appropriate to indicate the status of each PHY 106, 108, 110, 112.

SAS devices according to the present invention may feature reduced power consumption as compared to SAS devices known in the art.

Figure 5:
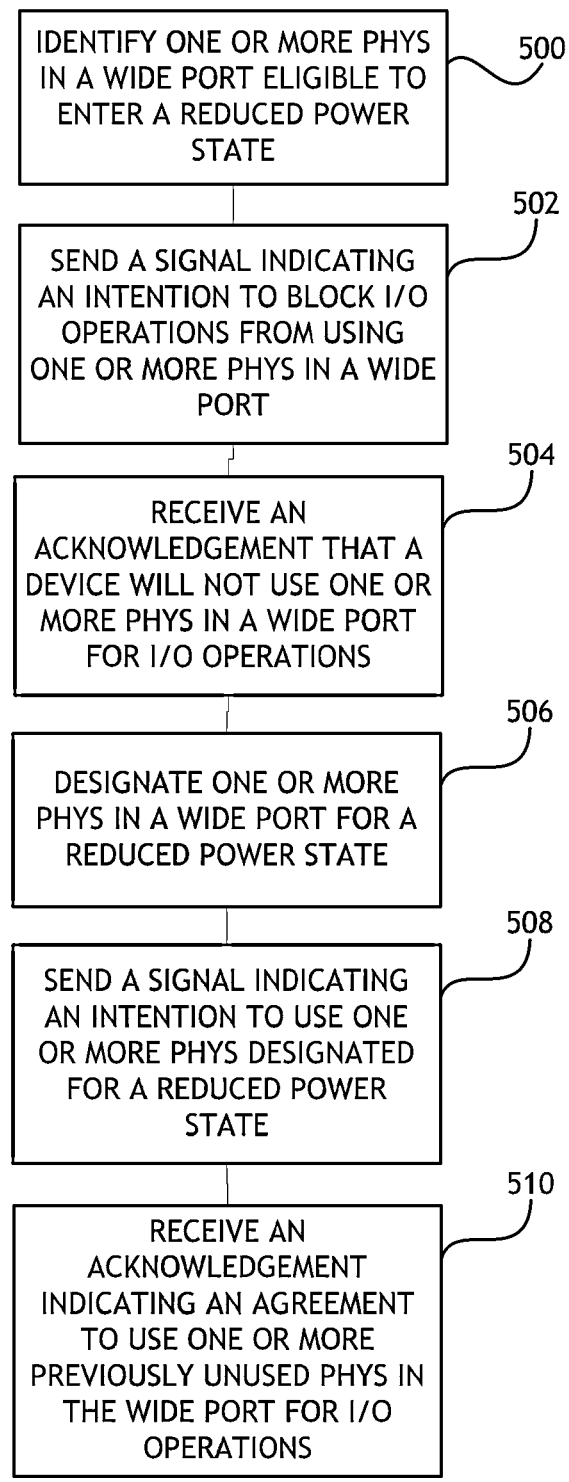
FIG. 5 shows a flowchart of a method for designating one or more PHYs to remain in a reduced power state.

Referring to FIG. 5, a flowchart for a method for designating PHYs as unused in a master device, such as an SAS expander, is shown. A processor in an SAS device may identify 500 one or more PHYs in a wide port eligible to enter a reduced power state. PHYs are eligible to enter a reduced power state when data traffic through a wide port occupies less than the entire bandwidth provided by the wide port, and the PHY would enter a reduced power state or persist in a reduced power state if other PHYs in the wide port were more completely utilized. The processor may then send 502 a signal indicating an intention to block data traffic from using one or more of the eligible PHYs. The processor may then continue to utilize all of the PHYs until the processor receives 504 an acknowledgment that the connected slave device will not use the one or more eligible PHYs indicated in the signal sent by the master device. The processor may then designate 506 the one or more eligible PHYs indicated in the signal as unused; the PHYs may subsequently enter reduced power states according to SAS standards.

At a later time, when data traffic increases beyond the bandwidth provided by active PHYs in a wide port, the master device may send 508 a signal to the slave device indicating an intention to use one or more of the designated unused PHYs. The processor may then receive 510 an acknowledgment from the slave device indicating that the slave device will activate the one or more PHYs indicated in the signal sent to the slave device.

Figure 6:
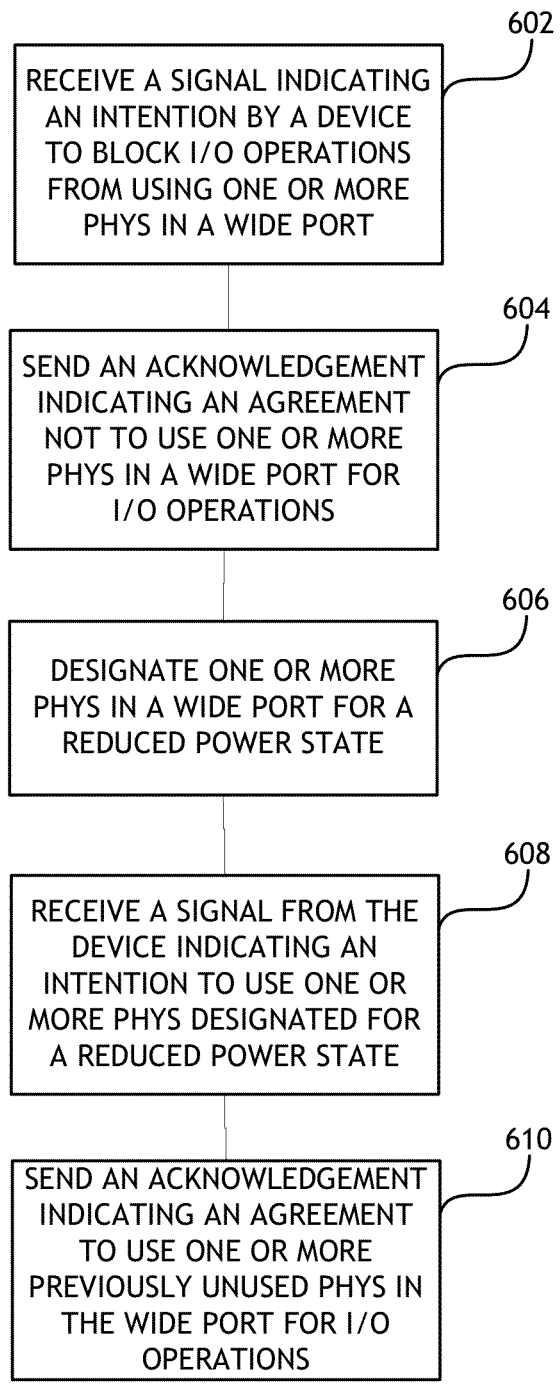
FIG. 6 shows a flowchart of a method for acknowledging that one or more PHYs are to remain in a reduced power state.

Referring to FIG. 6, a flowchart for a method for designating PHYs as unused in a slave device, such as an SAS end device, is shown. A processor in an SAS device may receive 602 a signal indicating an intention by a master device to block data traffic from using one or more of the PHYs associated with links connected to PHYs on the slave device. The processor may then send 604 an acknowledgment to the master device that the slave device will not use the one or more PHYs indicated in the signal sent by the master device. The processor may then designate 606 as unused the one or more PHYs associated with links connected to PHYs indicated in the signal sent from the master device; the PHYs may subsequently enter reduced power states according to SAS standards.

At a later time, when data traffic increases beyond the bandwidth provided by active PHYs in a wide port, the slave device may receive 608 a signal from the master device indicating an intention to use one or more of the designated unused PHYs. The processor may then send 610 an acknowledgment indicating to the master device that the slave device will activate the one or more PHYs indicated in the signal sent by the master device.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An SAS master apparatus comprising:
a processor;
memory connected to the processor;
a plurality of PHYs connected to the processor, each of the plurality of PHYs configured to be connected to one SAS slave; and
computer executable program code configured to execute on the processor,
wherein the computer executable program code is configured to:
configure each of the plurality of PHYs into a single wide port;
identify one or more PHYs in the plurality of PHYs eligible to enter a reduced power state;
send a PHY deactivate signal utilizing out-of-band signaling to the one SAS slave indicating an intention of the SAS master to route data traffic through PHYs other than the one or more PHYs in the plurality of PHYs eligible to enter a reduced power state;
receive a PHY deactivate response sent utilizing out-of-band signaling from the one SAS slave acknowledging the signal; and
designate the one or more PHYs in the plurality of PHYs eligible to enter a reduced power state as unused by including the one or more PHYs in a data structure stored in memory, said data structure configured to record unused PHYs.

2. The apparatus of claim 1, wherein the computer executable program code is further configured to:
send a PHY reactivate signal to the one SAS slave indicating an intention of the SAS master to route data traffic through one or more of the one or more PHYs in the plurality of PHYs designated as unused;
receive a PHY reactivate response from the one SAS slave acknowledging the signal; and
designate the one or more PHYs in the plurality of PHYs as usable.

3. The apparatus of claim 1, wherein the computer executable program code is further configured to:
monitor I/O requests associated with the single wide port to determine whether the I/O requests would substantially utilize bandwidth provided by one or more of the one or more designated unused PHYs.

4. The apparatus of claim 1, wherein the SAS master apparatus is a SAS expander.

5. The apparatus of claim 4, wherein the one SAS device is a SAS expander.

6. The apparatus of claim 4, wherein the one SAS device is a SAS end device.

7. The apparatus of claim 1, wherein the SAS master is a SAS initiator.

8. The apparatus of claim 7, wherein the one SAS device is a SAS end device.

9. An SAS slave apparatus comprising:
a processor;
memory connected to the processor;

a plurality of PHYs connected to the processor, each of the plurality of PHYs configured to be connected to one SAS device; and computer executable program code configured to execute on the processor, wherein the computer executable program code is configured to:

configure each of the plurality of PHYs into a single wide port;

receive a PHY deactivate signal sent utilizing out-of-band signaling from the one SAS device indicating an intention of the one SAS device to stop routing data traffic through one or more PHYs in the plurality of PHYs;

send a PHY deactivate response utilizing out-of-band signaling to the one SAS device acknowledging the signal; and designate the one or more PHYs as unused by including the one or more PHYs in a data structure stored in memory, said data structure configured to record unused PHYs.

10. The apparatus of claim 9, wherein the computer executable program code is further configured to:

receive a PHY reactivate signal from the one SAS device indicating an intention of the one SAS device to route data traffic through one or more of the one or more PHYs designated as unused;

send a PHY reactivate response to the one SAS device acknowledging the signal; and designate the one or more PHYs as usable.

11. The apparatus of claim 10, wherein the PHY reactivate signal utilizes out-of-band signaling.

12. The apparatus of claim 9, wherein the SAS slave is a SAS expander.

13. The apparatus of claim 9, wherein the SAS slave is a SAS end device.

14. A method for managing reduced power states in a SAS arrangement comprising:

identifying one or more PHYs in a plurality of PHYs eligible to enter a reduced power state;

sending a PHY deactivate signal utilizing out-of-band signaling to an SAS slave connected to the plurality of PHYs indicating an intention of an SAS master to route data traffic through PHYs other than the one or more PHYs in the plurality of PHYs eligible to enter a reduced power state;

receiving a PHY deactivate response sent utilizing out-of-band signaling from the SAS slave acknowledging the signal; and designating the one or more PHYs in the plurality of PHYs eligible to enter a reduced power state as unused by including the one or more PHYs in a data structure stored in memory, said data structure configured to record unused PHYs.

15. The method of claim 14, further comprising:

sending a PHY reactivate signal to the SAS slave indicating an intention of the SAS expander to route data traffic through one or more of the one or more PHYs in the plurality of PHYs designated as unused;

receiving a PHY reactivate response from the SAS slave acknowledging the signal; and designate the one or more PHYs in the plurality of PHYs as usable.

* * * * *